US008858091B2

(12) United States Patent
Koreeda et al.

(10) Patent No.: US 8,858,091 B2
(45) Date of Patent: Oct. 14, 2014

(54) OPTICAL CONNECTOR AND OPTICAL CONNECTOR DEVICE

(75) Inventors: Yuichi Koreeda, Tokyo (JP); Takayoshi Yamauchi, Tokyo (JP); Osamu Hashiguchi, Tokyo (JP); Naoki Katagiyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/983,125

(22) PCT Filed: Jan. 5, 2012

(86) PCT No.: PCT/JP2012/050062
§ 371 (c)(1),
(2), (4) Date: Aug. 1, 2013

(87) PCT Pub. No.: WO2012/120914
PCT Pub. Date: Sep. 13, 2012

(65) Prior Publication Data
US 2013/0315539 A1    Nov. 28, 2013

(30) Foreign Application Priority Data
Mar. 4, 2011   (JP) ................. 2011-048214

(51) Int. Cl.
*G02B 6/38* (2006.01)
(52) U.S. Cl.
CPC ............ *G02B 6/3893* (2013.01); *G02B 6/3849* (2013.01); *G02B 6/3885* (2013.01); *G02B 6/383* (2013.01)
USPC ................... 385/69; 385/53; 385/55; 385/56; 385/68; 385/70
(58) Field of Classification Search
USPC ............... 385/53, 55, 56, 68, 69, 70
See application file for complete search history.

(56) References Cited

U.S. PATENT DOCUMENTS

| 6,733,311 B2 * | 5/2004 | Kameda .................. 439/140 |
| 6,832,923 B2 * | 12/2004 | Sasame et al. .............. 439/137 |
| 2010/0254667 A1 | 10/2010 | He et al. |

FOREIGN PATENT DOCUMENTS

| JP | 2006-276782 A | 10/2006 |
| JP | 2009-42353 A | 2/2009 |
| JP | 2010-245040 A | 10/2010 |

OTHER PUBLICATIONS

International Search Report of PCT/JP2012/050062, Jan. 31, 2012.

* cited by examiner

*Primary Examiner* — Jennifer Doan
(74) *Attorney, Agent, or Firm* — Collard & Roe, P.C.

(57) ABSTRACT

Provided is an optical connector whose miniaturization is easier than conventional. An optical connector (100) comprises a housing (103) holding an optical member (101), a slider (105) slidably held by the housing (103), a shutter (107) provided to the slider (105) in an openable and closable manner and adapted to be opened and closed to expose and isolate the optical member (101) to and from the outside, and slider-side coil springs (109) pushing the slider (105) in a direction away from the housing (103). The slider-side coil springs (109) are disposed in a width direction of the shutter (107). The optical connector (100) is configured such that the shutter (107) is closed when the slider (105) is moved by an elastic force of the slider-side coil springs (109) in the direction (direction A1) away from the housing (103) and that the shutter (107) is opened when the slider (105) is moved against the elastic force of the slider-side coil springs (109) in a direction approaching the housing (103).

12 Claims, 12 Drawing Sheets

OPTICAL CONNECTOR AND OPTICAL CONNECTOR DEVICE

CROSS REFERENCE TO RELATED APPLICATIONS

This application is the National Stage of PCT/JP2012/050062 filed on Jan. 5, 2012, which claims priority under 35 U.S.C. §119 of Japanese Application No. 2011-048214 filed on Mar. 4, 2011, the disclosure of which is incorporated by reference. The international application under PCT article 21(2) was not published in English.

TECHNICAL FIELD

This invention relates to an optical connector and an optical connector device.

BACKGROUND ART

An optical connector is a connector which is used for connection between a plurality of optical fibers. The optical connector may have a structure in which a shutter is provided for preventing, in a state where only one of the optical fibers is connected, a front end of the connected optical fiber from being exposed to the outside.

This is because if the front end of the connected optical fiber is exposed in the state where only one of the optical fibers is connected, there is a possibility that dust adheres to the exposed front end of the optical fiber, and this is for preventing light emitted from the front end of the optical fiber from damaging an eye of an operator.

As the structure provided with the shutter, there is known, for example, a structure described in Patent Document 1.

As shown in FIGS. 10 to 13, an optical connector 1 of Patent Document 1 comprises a connector housing 20, a sleeve 30 fixed to the inside of the connector housing 20, a movable portion 40 slidable in the connector housing 20, and a movable spring 60 biasing the movable portion 40.

Figure 11:
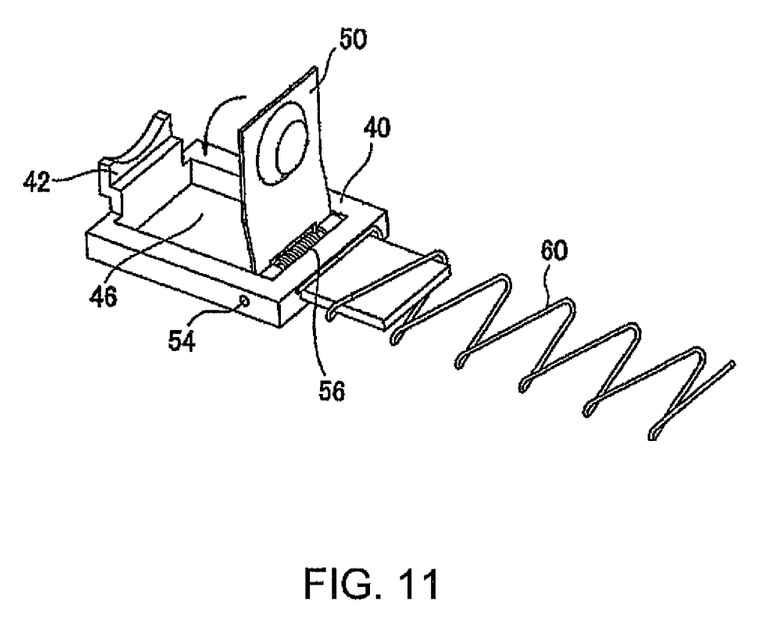
FIG. 11 is a perspective view showing members around a movable portion 40 in FIG. 10.
Figure 12:
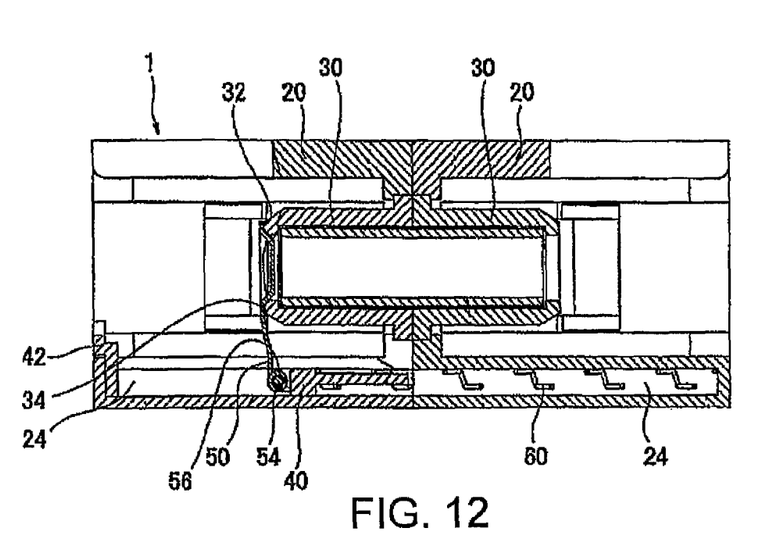
FIG. 12 is a 12-12 cross-sectional view of FIG. 10.

As shown in FIG. 11, a shutter 50 is attached to the movable portion 40 so as to be rotatable about a retaining pin 54 for opening and closing the sleeve 30. As shown in FIG. 12, the movable portion 40 and the movable spring 60 are received in a receiving portion 24 with a rectangular cross section and the shutter 50 is in a state of being constantly biased toward the sleeve end face 32 side of the sleeve 30 by a presser bar spring 56.

When a non-illustrated plug housing coupled with an optical fiber is fitted into the connector housing 20 of the optical connector 1 in the state where the shutter 50 is closed as shown in FIG. 12, a front-side side wall 42 of the movable portion 40 is brought into contact with a front-side side wall of the non-illustrated plug housing so that the movable portion 40 moves toward the inside of the receiving portion 24, i.e. toward the rear side of the receiving portion 24, against a spring force of the movable spring 60.

With the movement of the movable portion 40, the retaining pin 54 fixed to the movable portion 40 also moves toward the rear side of the connector housing 20.

Figure 13:
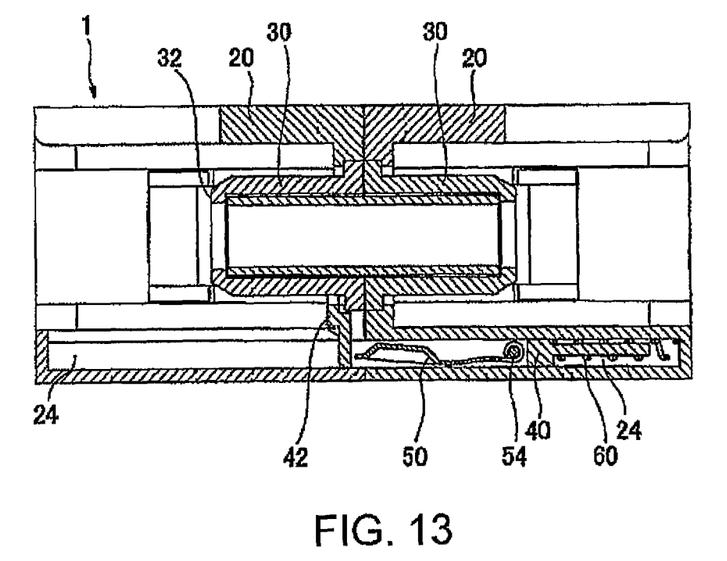
FIG. 13 is a cross-sectional view showing a state where a shutter 50 is opened from a state of FIG. 12.

The shutter 50, partially, is in abutment with the sleeve end face 32. Therefore, with the movement of the retaining pin 54, the shutter 50 is rotated, using an abutting portion 34 as a fulcrum, toward the inner wall side on the movable portion 40 side against an elastic force of the presser bar spring 56 so as to be received in a frame 46 of the movable portion. By this rotation of the shutter 50, the shutter 50 covering the sleeve end face 32 is opened as shown in FIG. 13.

As described above, the optical connector 1 is configured so that the shutter 50 is automatically opened in response to the fitting of the plug housing (Patent Document 1).

PRIOR ART DOCUMENT

Patent Document

Patent Document 1: JP-A-2009-42353

SUMMARY OF THE INVENTION

Problem to be Solved by the Invention

However, with the structure of Patent Document 1, since the movable portion 40 and the movable spring 60 are arranged in tandem in the fitting direction, the overall length of the connector housing 20 should be set to at least the sum of the length of the movable portion 40 and the length of the movable spring 60 or more. Therefore, there has been a problem that it is difficult to miniaturize the connector.

This invention has been made in view of the above-mentioned problem and it is an object of this invention to provide an optical connector whose miniaturization is easier than conventional.

Means for Solving the Problem

In order to solve the above-mentioned problem, according to this invention, there is provided an optical connector comprising: a housing holding an optical member; a slider slidably held by the housing; a shutter provided to the slider in an openable and closable manner and adapted to be opened and closed to expose and isolate the optical member to and from the outside; and an at least one elastic member pushing the slider in a direction away from the housing, wherein the elastic member is disposed in a width direction of the shutter, wherein the shutter is closed when the slider is moved by an elastic force of the elastic member in the direction away from the housing, and wherein the shutter is opened when the slider is moved against the elastic force of the elastic member in a direction approaching the housing.

It is desired that the shutter comprises a plate-like front plate adapted to cover the optical member; side plates provided at both ends of the front plate; and rotary shafts which are provided to the side plates more on a housing side than both ends of the front plate and offset to a lower side of the housing and which are rotatably held by the slider, and wherein the shutter is opened and closed while rotating with respect to the rotary shafts.

It is desired that the slider comprises a pair of holding portions which hold therebetween each of the rotary shafts of the shutter, and wherein each rotary shaft has an elliptical shape (oval shape or a track shape).

Further, it is desired that the housing comprises a body having a Π-shape in plan view and has slide portions provided at facing surfaces, on the inside of the Π-shape, of the body so as to face each other and each having a guide surface parallel to the sliding direction and an abutting portion extending downward from the guide surface, wherein the side plates of the shutter each have an engaging portion adapted to engage with the abutting portion in a closed state, and wherein when the slider is moved against the elastic force of the elastic member in the direction approaching the housing, the engaging portions disengage from the abutting portions and move while riding on the guide surfaces so that the shutter is rotated with respect to the rotary shafts so as to be opened.

On the other hand, it is desired that the slider comprises a plate-like bottom plate and a pair of slide fixing portions provided on both sides of the bottom plate and each having a box shape in which at least a surface facing a front surface of the Π-shape of the housing is open, the box shape adapted to cover each of portions corresponding to two sides at both ends of the Π-shape, and wherein slits are formed in surfaces facing each other of the pair of slide fixing portions and both side surfaces of each slit form the pair of holding portions.

Further, it is desired that the housing comprises a guide pin provided at one of the portions corresponding to the two sides at both ends of the Π-shape; and a guide pin receiver provided at the other of the portions corresponding to the two sides at both ends of the Π-shape and engageable with a guide pin, wherein the slider comprises a guide pin receiver through hole which is provided in one of the pair of slide fixing portions and in which the guide pin receiver is inserted; and a guide pin through hole which is provided in the other of the pair of slide fixing portions and in which the guide pin is inserted, the guide pin through hole having a diameter smaller than that of the guide pin receiver through hole, and wherein when the slider is moved, the guide pin receiver and the guide pin are exposed from the guide pin receiver through hole and the guide pin through hole, respectively.

It is desired that the front plate of the shutter has a side shape that follows a circular arc having the rotary shaft at its center, and a radius of the circular arc is set to a distance between the rotary shaft and an upper surface of the housing or less.

Further, it is desired that the elastic member is a coil spring and is provided so that both ends thereof are in contact with at least one of the portions corresponding to the two sides at both ends of the Π-shape of the housing and in contact with at least one of the slide fixing portions, the elastic member pushing the slide fixing portion in the direction away from the housing.

It is desired that the housing has a locking portion adapted to abut against the side plate of the shutter when the shutter is closed.

It is desired that the elastic member is provided in a pair and the pair of elastic members are arranged in parallel in the width direction of the shutter.

According to another aspect of this invention, there is provided an optical connector device comprising the two optical connectors, wherein the optical connector device has a structure in which the guide pin receiver exposed from the slider of each of the two optical connectors abuts against a periphery of the guide pin through hole of the slide fixing portion of the other optical connector and pushes the slide fixing portion thereof so that the sliders of the optical connectors are moved, thereby connecting the two optical connectors together.

Effect of the Invention

According to this invention, it is possible to provide an optical connector whose miniaturization is easier than conventional.

MODE FOR CARRYING OUT THE INVENTION

Hereinbelow, a preferred embodiment of this invention will be described in detail with reference to the drawings.

Figure 1A:
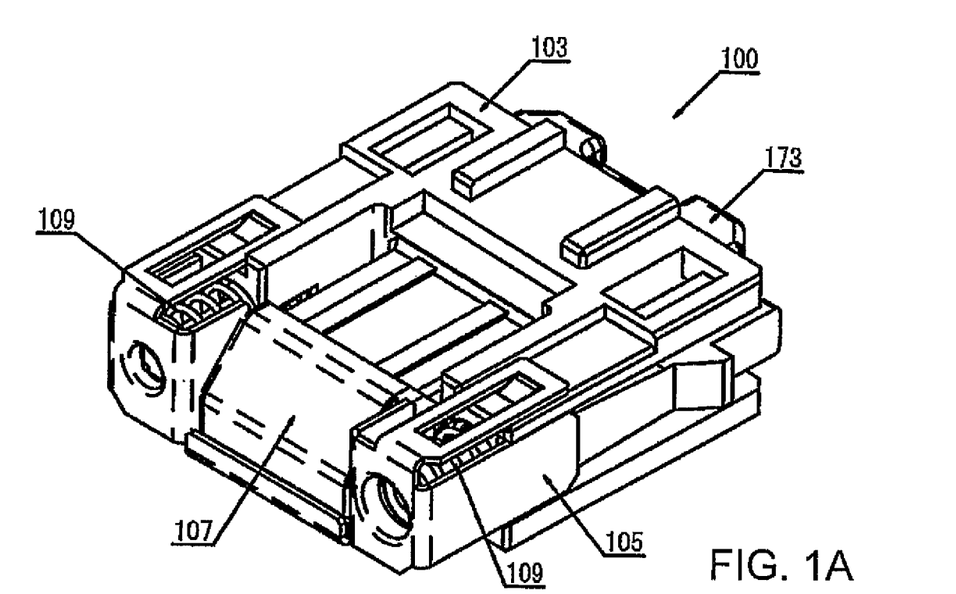
FIG. 1A is a perspective view showing an optical connector 100 according to this embodiment.
Figure 1B:
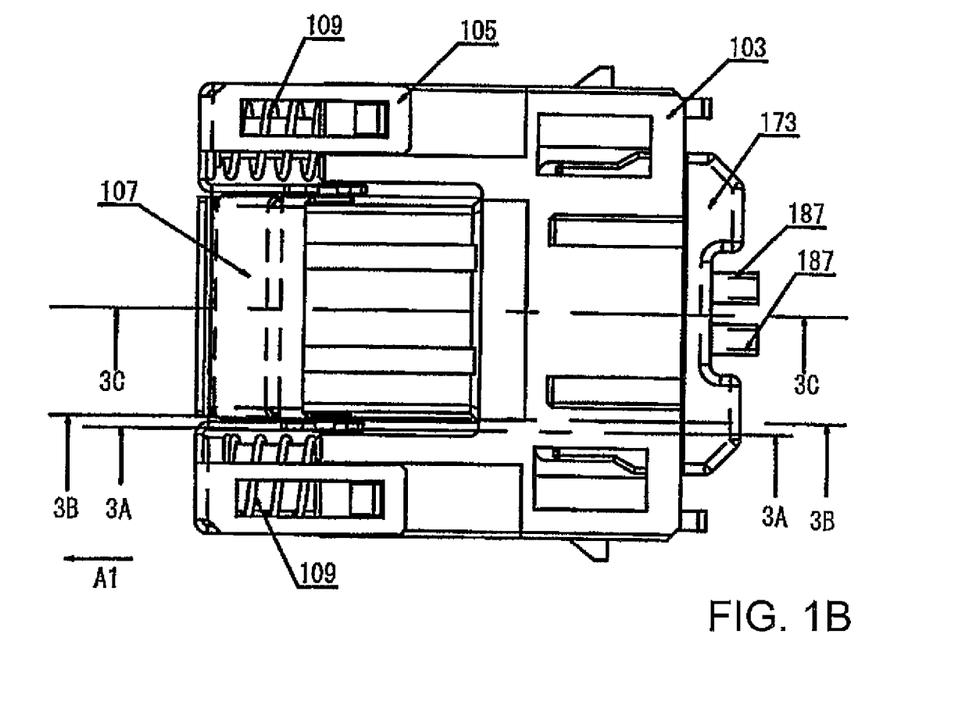
FIG. 1B is a plan view of FIG. 1A.
Figure 2:
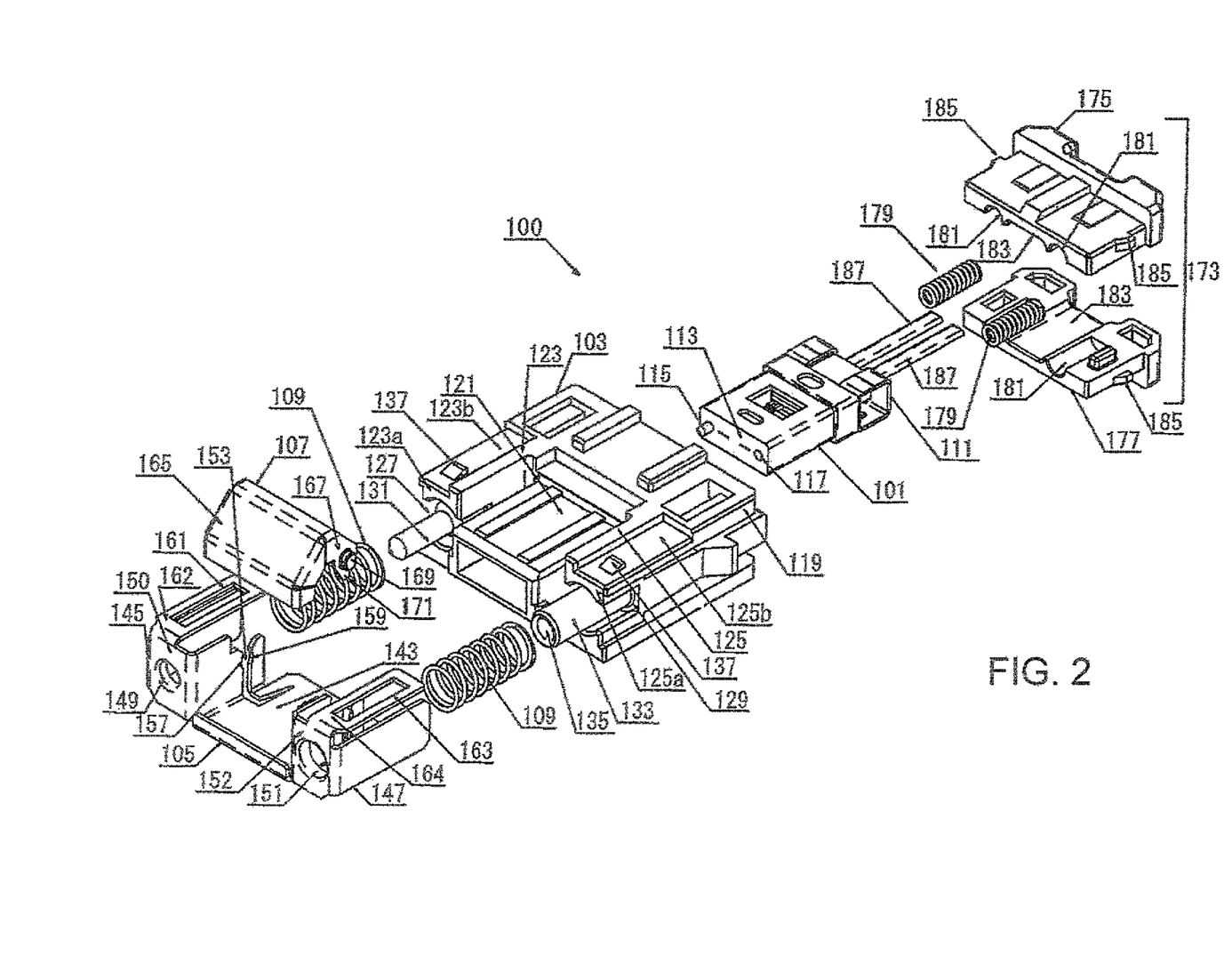
FIG. 2 is an exploded perspective view of the optical connector 100.

First, referring to FIGS. 1A, 1B, and 2, an optical connector 100 according to this embodiment will be schematically described.

As shown in FIGS. 1A, 1B, and 2, the optical connector 100 comprises an optical member 101 coupled with optical fibers 187, a housing 103 movably holding the optical member 101, a slider 105 slidably held by the housing 103, a shutter 107 provided to the slider 105 in an openable and closable manner and adapted to be opened and closed to expose and isolate the optical member 101 to and from the outside, and slider-side coil springs 109 arranged in parallel in a width direction of the shutter 107 and pushing the slider 105 in a direction (direction A1 in FIG. 1B) away from the housing 103, i.e. toward the connection mating side.

The optical connector 100 further comprises a protective boot 173 provided in the rear of the optical member 101 and fixed to the housing 103, and boot-side coil springs 179 provided between the protective boot 173 and the optical member 101 and pushing the optical member 101 toward the connection mating side (direction A1).

Referring to FIGS. 1A to 3C, the structural members of the optical connector 100 will be described in further detail.

The optical member 101 is a member adapted to be coupled with the optical fibers 187 and has a flat box shape in FIGS. 1A and 1B. As shown in FIG. 2, one surface of the box shape forms an optical fiber insertion surface 111 through which the optical fibers 187 are adapted to be inserted, while a surface facing the optical fiber insertion surface 111 forms a connection surface 113 which is adapted to be connected to an optical member of another optical connector.

In FIG. 2, the connection surface 113 has a connection surface convex portion 115 and a connection surface concave portion 117 which are provided for positioning at the time of fitting.

The housing 103 is an insulating member which holds the optical member 101, the slider 105, the slider-side coil springs 109, the boot-side coil springs 179, and the protective boot 173. As shown in FIGS. 1A, 1B, and 2, the housing 103 comprises a flat box-shaped body 119 having a Π-shape in plan view and a flat box-shaped optical member receiving portion 121 protruding from the inside of the Π-shape at a portion corresponding to one side joining two sides of the three sides forming the Π-shape of the body 119. Further, portions corresponding to the facing two sides of the three sides forming the Π-shape form box-shaped both-end box portions 123 and 125.

Figure 5A:
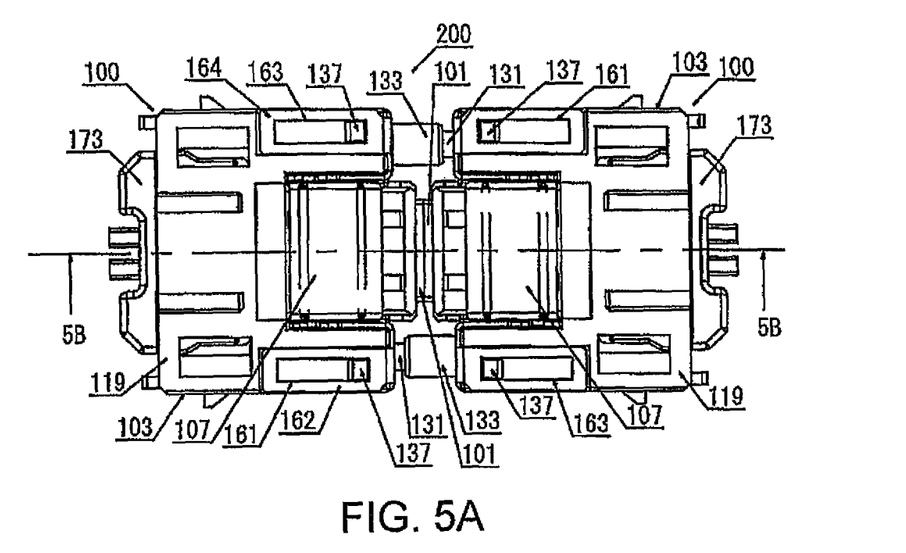
FIG. 5A is a diagram showing a process when the optical connectors 100 are fitted to each other, and is a plan view showing a state after the fitting.
Figure 5B:
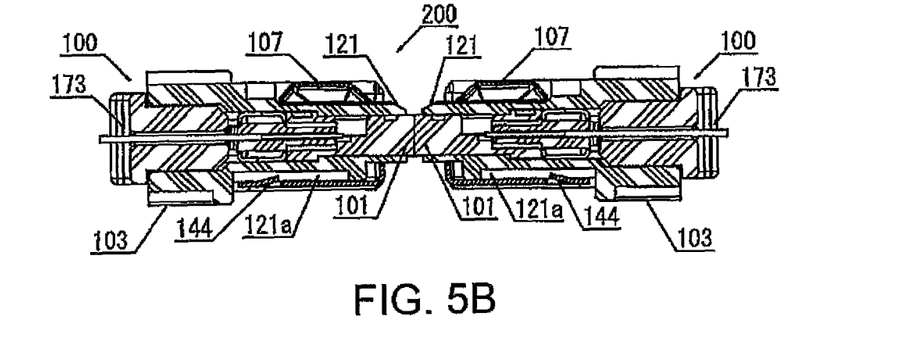
FIG. 5B is a diagram showing the process when the optical connectors 100 are fitted to each other, and is a 5B-5B cross-sectional view of FIG. 5A.

The optical member receiving portion 121 is a portion in which the optical member 101 is received. The height, in a flattening direction, of the optical member receiving portion 121 is lower than that of the body 119 so that a gap is formed in the height direction between the optical member receiving portion 121 and the body 119. Although details will be described later, as shown in FIGS. 5A and 5B, the shutter 107 moves in this gap portion in the state where the shutter 107 is opened.

Accordingly, in the following description, for the respective members, a surface on the side that is covered by the shutter 107 when the shutter 107 is opened, or a surface oriented in the same direction as this surface will be referred to as an "upper surface", a surface on the side opposite to the upper surface will be referred to as a "lower surface", a surface on the side where the optical member receiving portion 121 protrudes will be referred to as a "front surface", a surface on the side opposite to the front surface will be referred to as a "rear surface", and a remaining surface will be referred to as a "side surface", and further, a direction in which the optical member receiving portion 121 protrudes (i.e. the direction of the normal vector of the "front surface") will be referred to as a "protruding direction".

Further, in the housing 103, front surfaces 123a and 125a of the both-end box portions 123 and 125 are formed with concave elastic member receiving recesses 127 and 129 receiving therein the slider-side coil springs 109.

A cylindrical guide pin 131 and a cylindrical guide pin receiver 133 are provided so as to respectively protrude from bottom surfaces of the elastic member receiving recesses 127 and 129 toward the front surface 123a, 125a side. The guide pin 131 and the guide pin receiver 133 hold the slider-side coil springs 109 and are adapted to be fitted to the other optical connector.

The guide pin receiver 133 has a front surface provided with a concave guide pin insertion hole 135 into which a guide pin 131 (or a member, corresponding to the guide pin 131, of the mating optical connector) is adapted to be inserted. The guide pin insertion hole 135 has a diameter greater than that of the guide pin 131.

On upper surfaces 123b and 125b of the both-end box portions 123 and 125 of the housing 103, slider coming-off preventing projections 137 are provided for preventing coming-off of the slider 105. As shown in FIG. 3C, a recess 121a for preventing coming-off of the slider 105 is also provided on a lower surface of the optical member receiving portion 121.

Figure 3A:
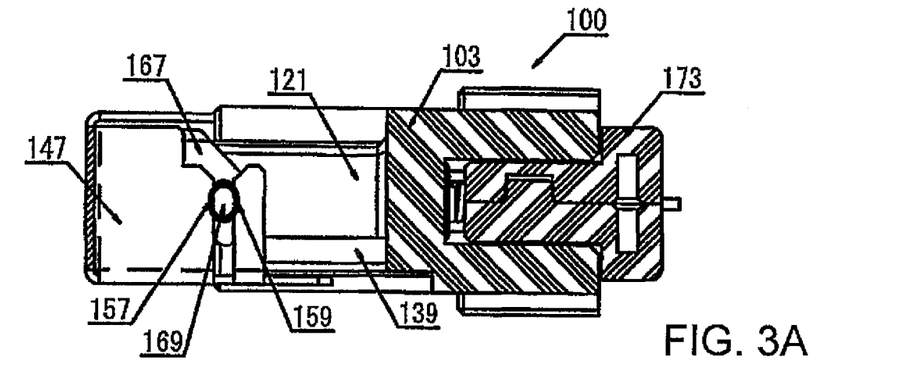
FIG. 3A is a 3A-3A cross-sectional view of FIG. 1B.
Figure 3B:
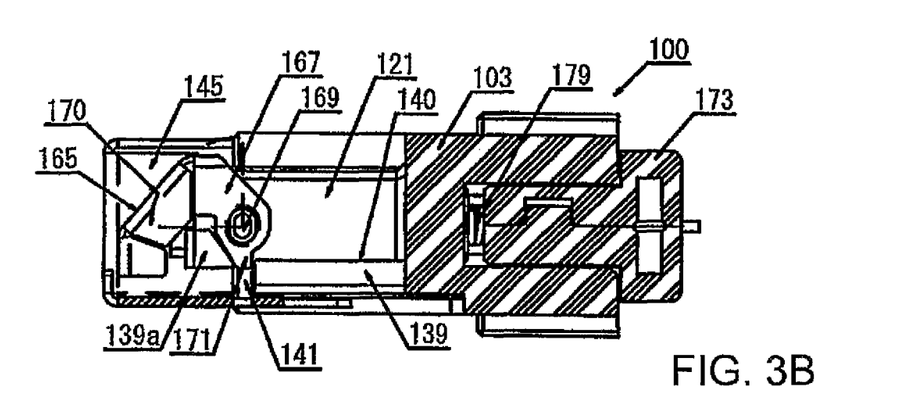
FIG. 3B is a 3B-3B cross-sectional view of FIG. 1B.
Figure 3C:
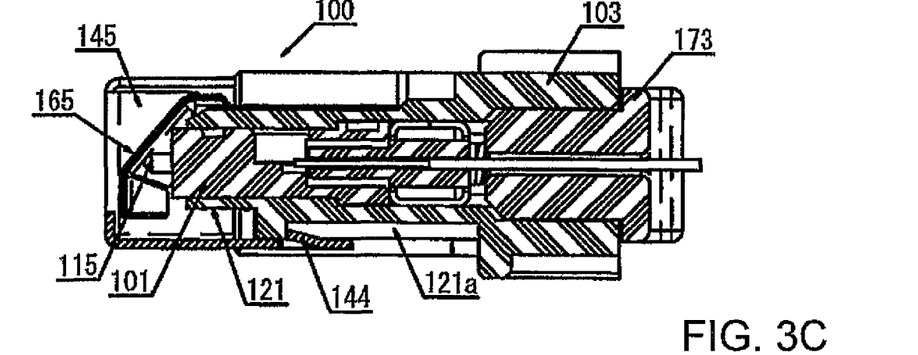
FIG. 3C is a 3C-3C cross-sectional view of FIG. 1B.

Further, at side surfaces, corresponding to the inside of the "Π-shape", of the both-end box portions 123 and 125 of the housing 103, as shown in FIGS. 3A and 3B, rod-like slide projections 139 are provided in parallel to the protruding direction so as to face each other. Near a front end of each slide projection 139, a shutter fixing groove 141 is provided so as to extend downward from an upper surface of the slide projection 139. The slide projection 139 is formed with a locking portion 139a on the front side of the shutter fixing groove 141. The locking portion 139a is inclined so as to be higher on the front side. The upper surface of each slide projection 139 forms a guide surface 140.

The slider 105 is a member that holds the shutter 107 and slides to open and close the shutter 107 jointly with the housing 103. As shown in FIG. 2, the slider 105 comprises a bottom plate 143 having a size and shape corresponding to that of the bottom surface of the optical member receiving portion 121 and slide fixing portions 145 and 147 provided on both sides of the bottom plate 143. The slide fixing portions 145 and 147 each have a box shape in which at least a surface facing the housing 103 is open, and cover the both-end box portions 123 and 125 of the housing 103.

Front surfaces 150 and 152, which are the surfaces facing the open ends, of the slide fixing portions 145 and 147 are provided with a guide pin through hole 149 and a guide pin receiver through hole 151 through which the guide pin 131 and the guide pin receiver 133 are adapted to protrude, respectively. Since the guide pin through hole 149 and the guide pin receiver through hole 151 respectively have sizes corresponding to the guide pin 131 and the guide pin receiver 133, the guide pin through hole 149 is smaller in diameter than the guide pin receiver through hole 151.

Inner side surfaces, joined to the bottom plate 143 and facing each other, of the slide fixing portions 145 and 147 are formed with slits 153 which extend upward from the bottom plate 143. Both side surfaces of each slit 153 are formed with concave rotary shaft holding portions 157 and 159 which hold the rotary shafts 169 of the shutter 107.

Further, in upper surfaces 162 and 164 of the slide fixing portions 145 and 147, elongated holes 161 and 163 that engage with the slider coming-off preventing projections 137 of the housing 103 are provided along the protruding direction.

As shown in FIG. 3C, the bottom plate 143 is provided with a cut-bent portion 144 which is cut and bent so as to rise toward the slide fixing portion 145, 147 side and engages with the recess 121a of the optical member receiving portion 121 for preventing coming-off of the slider 105.

The shutter 107 is a member which is opened and closed to expose and isolate the optical member 101 to and from the outside. As shown in FIGS. 2 to 3B, the shutter 107 comprises a plate-like front plate 165 formed so as to cover the connection surface 113 of the optical member 101, side plates 167 provided at both side ends of the front plate 165 and having flat surfaces parallel to an opening/closing direction of the front plate 165, and elliptical (oval or track-shaped) rotary shafts 169 which are provided to the side plates 167 more on the housing 103 side than both ends of the front plate 165 and offset to the lower side of the housing 103 and which are each rotatably held between the rotary shaft holding portions 157 and 159 of the slider 105. The rotary shafts 169 are formed on the side plates 167 so as to protrude therefrom toward the slide fixing portion 145, 147 sides.

Figure 8A:
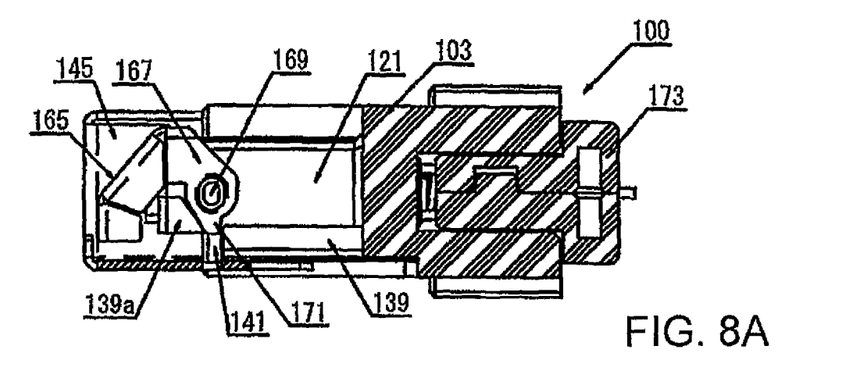
FIG. 8A is a 3B-3B cross-sectional view of FIG. 1B and is a diagram showing a state corresponding to FIG. 6A.
Figure 8B:
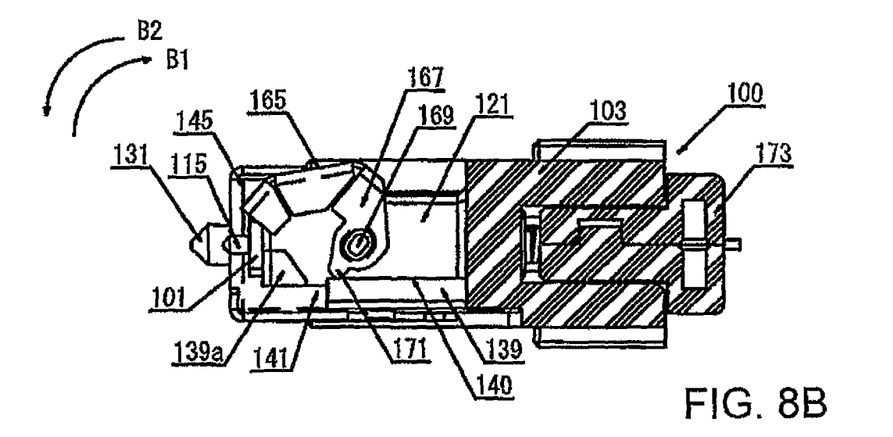
FIG. 8B is a 3B-3B cross-sectional view of FIG. 1B and is a diagram showing a state corresponding to FIG. 6B.
Figure 8C:
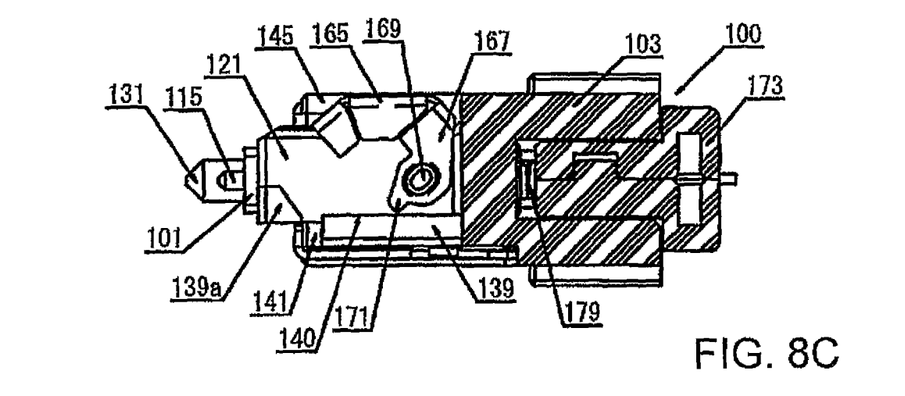
FIG. 8C is a 3B-3B cross-sectional view of FIG. 1B and is a diagram showing a state corresponding to FIG. 6C.
Figure 9A:
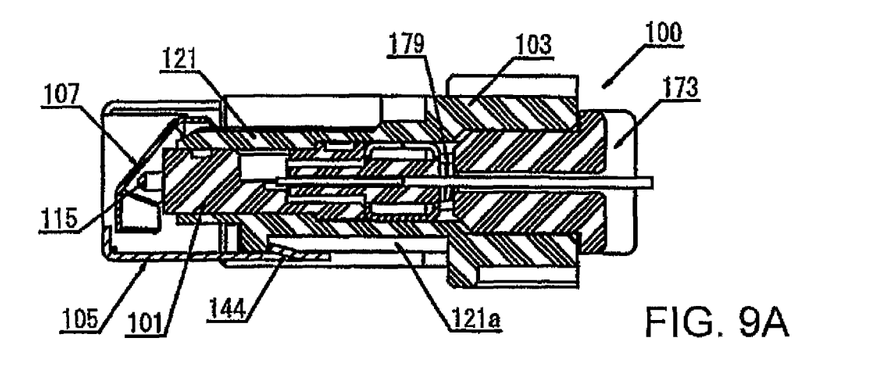
FIG. 9A is a 3C-3C cross-sectional view of FIG. 1B and is a diagram showing a state corresponding to FIG. 6A.
Figure 9B:
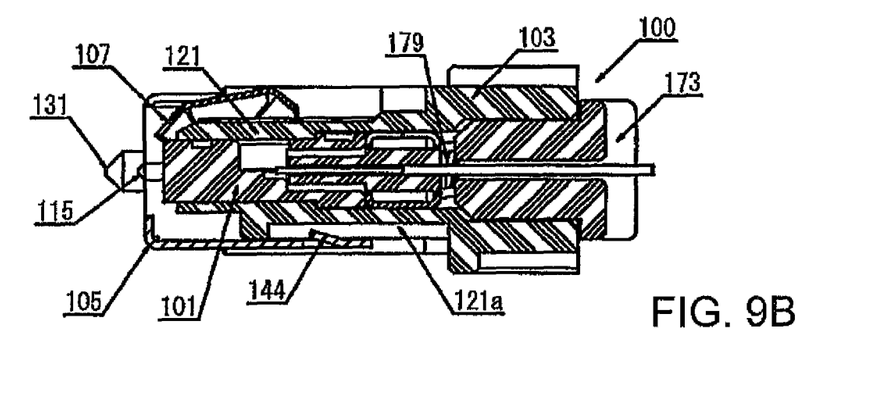
FIG. 9B is a 3C-3C cross-sectional view of FIG. 1B and is a diagram showing a state corresponding to FIG. 6B.
Figure 9C:
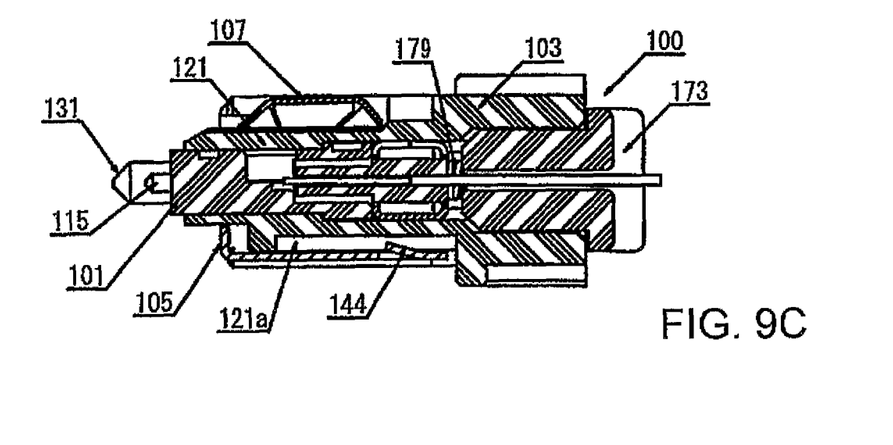
FIG. 9C is a 3C-3C cross-sectional view of FIG. 1B and is a diagram showing a state corresponding to FIG. 6C.
Figure 10:
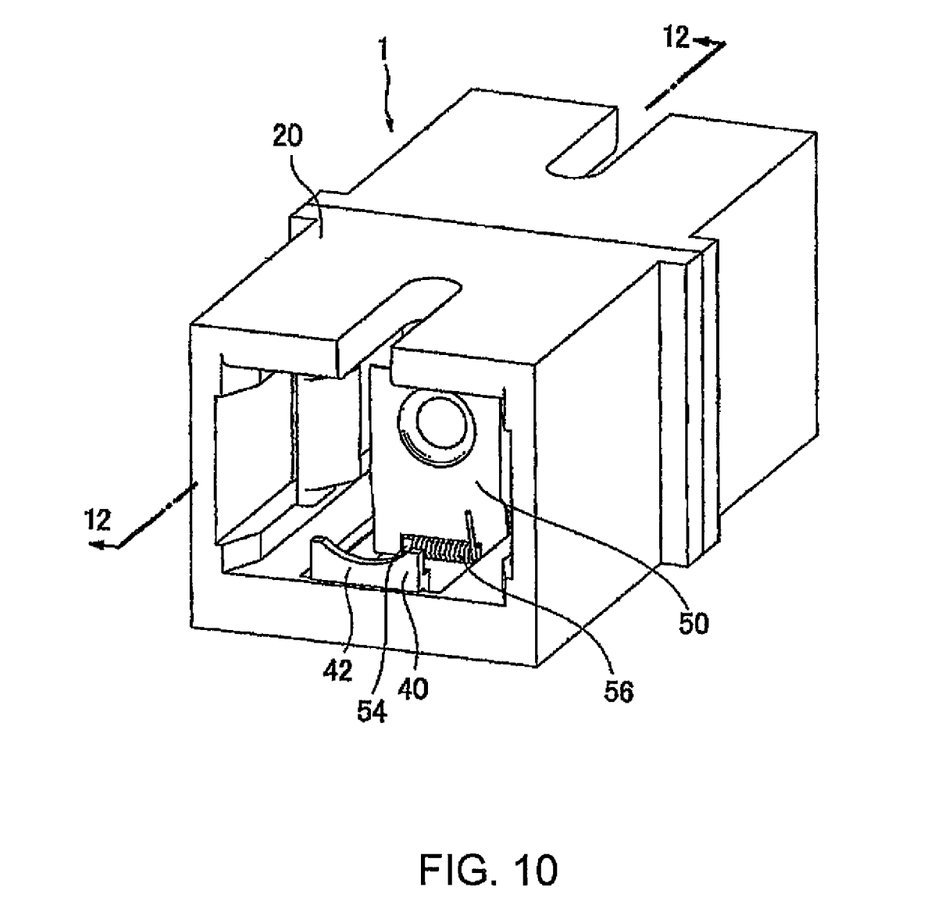
FIG. 10 is a perspective view showing a prior art optical connector 1.

More specifically, as shown in FIG. 3B, the front plate 165 of the shutter 107 has a shape (herein, a polygonal shape) that follows a circular arc 170 having the rotary shaft 169 at its center, and the radius of this circular arc 170 is set to the distance between the rotary shaft 169 and an upper surface of the housing 103 or less. Accordingly, as shown in FIG. 8C, it is configured such that an upper surface of the front plate 165 of the shutter 107 is approximately flush with the upper surface of the housing 103 and does not protrude from the housing 103.

The plan-view shape of each rotary shaft 169 is, as described above, elliptical and each rotary shaft 169 is disposed so that the minor axis is in contact with the rotary shaft holding portions 157 and 159 in the state where the shutter 107 is closed.

By making the rotary shaft 169 elliptical as described above, compared to the case where it is made perfectly circular, the rotary shaft 169 does not easily slide and rotate due to an external force in the state where it is pressed between the rotary shaft holding portions 157 and 159.

On the other hand, an end portion (end portion on the lower side of the rotary shaft 169) of each side plate 167 of the shutter 107 forms an engaging portion 171. The engaging portion 171 is in engagement with the shutter fixing groove 141 of the slide projection 139 of the housing 103 in the state where the shutter 107 is closed.

The protective boot 173 is a member that holds the optical member 101 through the boot-side coil springs 179, thereby serving to prevent coming-off of the optical member 101 at the time of fitting to the other optical connector. In FIG. 2, the protective boot 173 has a shape in which an upper boot 175 and a lower boot 177, which are two block-like members, are joined vertically.

The upper boot 175 and the lower boot 177 are provided on their inner surfaces (joined surfaces) with boot-side recesses 181 which are formed on the front side and in which the boot-side coil springs 179 are inserted, and with a boot-side through hole 183 which is formed passing through from the front to the rear for insertion of the optical fibers 187, and are provided on their outer surfaces with boot-side projections 185 which are fitted to the housing 103.

Each slider-side coil spring 109 is an elastic member that pushes the slider 105 in the direction (direction A1 in FIG. 1B) away from the housing 103, and has a size and shape that can be received in the elastic member receiving recess 127, 129 of the housing 103 and the slide fixing portion 145, 147 of the slider 105.

Each slider-side coil spring 109 is received in the elastic member receiving recess 127, 129 (the slide fixing portion 145, 147) in a state of being compressed so that one end of the slider-side coil spring 109 is in contact with the bottom surface of the elastic member receiving recess 127, 129 of the housing 103 while the other end thereof is in contact with the inside of the front surface 150, 152 of the slide fixing portion 145, 147. Accordingly, by its elastic restoring force, the slider-side coil spring 109 constantly pushes the slider 105 in the direction (direction A1 in FIG. 1B) away from the housing 103.

Next, the assembly sequence of the optical connector 100 will be described.

First, the shutter 107 is attached to the slider 105.

Specifically, the rotary shafts 169 are press-fitted into the slits 153 of the slide fixing portions 145 and 147 at a position where an inner surface (portion corresponding to the inside of the circular arc 170) of the front plate 165 of the shutter 107 faces the bottom plate 143 of the slider 105, thereby engaging the rotary shafts 169 with the rotary shaft holding portions 157 and 159.

Then, the slider 105 is attached to the housing 103.

Specifically, first, the slider-side coil springs 109 are inserted into the elastic member receiving recesses 127 and 129 of the housing 103 and, in this state, while the open surfaces of the slide fixing portions 145 and 147 are caused to face the front surfaces 123a and 125a of the both-end box portions 123 and 125 of the housing 103 and the upper surfaces 123b and 125b of the both-end box portions 123 and 125 and the upper surfaces 162 and 164 of the slide fixing portions 145 and 147 are oriented in the same direction, the elastic member receiving recesses 127 and 129 are inserted into the slide fixing portions 145 and 147.

Thereupon, the slider coming-off preventing projections 137 on the upper surface of the housing 103 ride over the upper surfaces 162 and 164 of the slide fixing portions 145 and 147 to engage with the elongated holes 161 and 163 so that the both-end box portions 123 and 125 of the housing 103 and the slide fixing portions 145 and 147 are brought into engagement with each other while the both-end box portions 123 and 125 are covered by the slide fixing portions 145 and 147.

Further, the cut-bent portion 144 of the bottom plate 143 rides over the lower surface of the optical member receiving portion 121 to engage with the recess 121a.

Further, the engaging portions 171 of the shutter 107 are caused to engage with the shutter fixing grooves 141 of the slide projections 139 of the housing 103.

In this state, the shutter 107 is in a closed state.

Although the slider 105 is pushed in the direction (direction A1 in FIG. 1B) away from the housing 103 by the slider-side coil springs 109, since the slider coming-off preventing projections 137 are in engagement with the elongated holes 161 and 163 and the cut-bent portion 144 is in engagement with a side surface of the recess 121a, the slider 105 is prevented from coming off the housing 103.

Then, the optical member 101 attached with the optical fibers 187 is inserted into the optical member receiving portion 121 from the rear of the housing 103 with the connection surface 113 facing the front.

Then, the protective boot 173 is assembled by joining the upper boot 175 and the lower boot 177 vertically and the boot-side coil springs 179 are inserted into the boot-side recesses 181.

Finally, the protective boot 173 is inserted from the rear of the housing 103, thereby thrusting the boot-side coil springs 179 against the rear surface of the optical member 101 and, further, engaging the boot-side projections 185 into non-illustrated recesses inside the housing 103 to fix the protective boot 173.

In this manner, the optical connector 100 shown in FIGS. 1A and 1B is assembled.

In the assembly, the slider 105 may be attached to the housing 103 after the optical member 101 is received in the optical member receiving portion 121.

Next, operations when the optical connector 100 engages with and disengages from the other connector, particularly operations of the slider 105 and the shutter 107, will be described with reference to FIGS. 4A to 9C.

Herein, a description will be given of, as an example, operations when an optical connector device 200 shown in FIGS. 5A and 5B is formed by engaging the optical connectors 100 with each other.

Figure 4A:
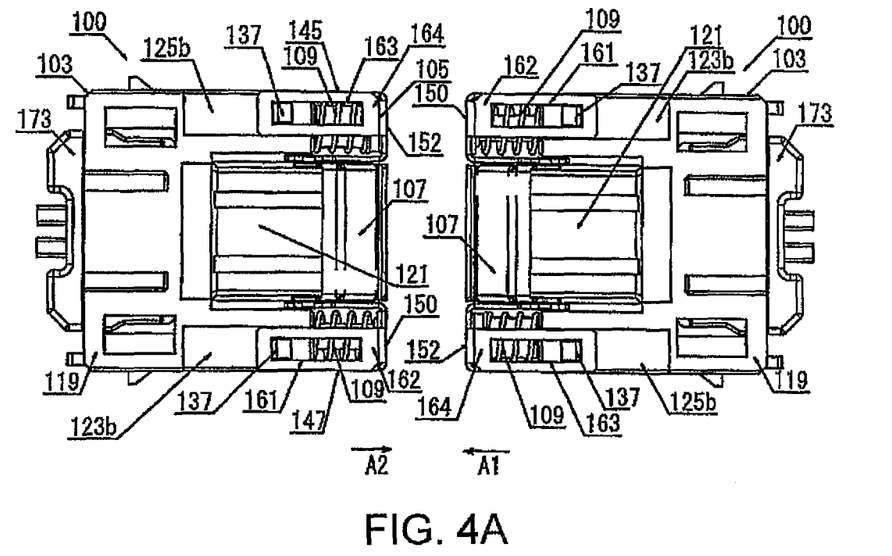
FIG. 4A is a diagram showing a process when the optical connectors 100 are fitted to each other, and is a plan view showing a state before the fitting.
Figure 4B:
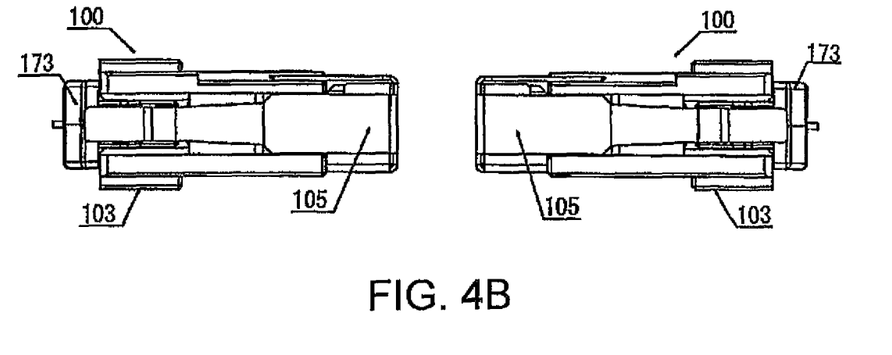
FIG. 4B is a diagram showing the process when the optical connectors 100 are fitted to each other, and is a side view of FIG. 4A.

First, as shown in FIGS. 4A and 4B, the optical connectors 100 are arranged so that the sliders 105 face each other and the guide pin receivers 133 and the guide pins 131 face each other in the state where the shutters 107 are closed (the state of FIGS. 6A, 7A, 8A, and 9A).

Then, in this state, the optical connectors 100 are respectively moved in directions A1 and A2 in FIG. 4A, thereby butting the sliders 105 against each other.

Thereupon, the sliders 105 slide toward the housings 103 against elastic forces of the slider-side coil springs 109.

In this event, since the shutters 107 are held by the sliders 105, the shutters 107 move along with the sliders 105. In this event, the engaging portions 171 are pushed by end portions of the shutter fixing grooves 141 of the slide projections 139 and thus ride on the guide surfaces 140 of the slide projections 139 from the shutter fixing grooves 141 while rotating in a direction B1 in FIG. 8B with respect to the rotary shafts 169.

Consequently, as shown in FIGS. 6B, 7B, 8B, and 9B, the shutters 107 start to be opened so that the connection surfaces 113 of the optical members 101 start to be exposed.

Figure 6A:
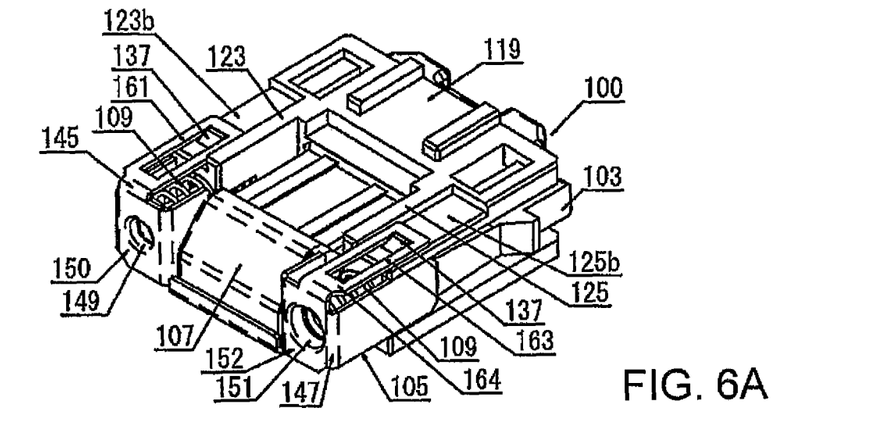
FIG. 6A is a perspective view showing a process when the optical connectors 100 are fitted to each other, and is a diagram showing a state where a shutter 107 is closed, wherein one of the optical connectors is not illustrated.
Figure 6B:
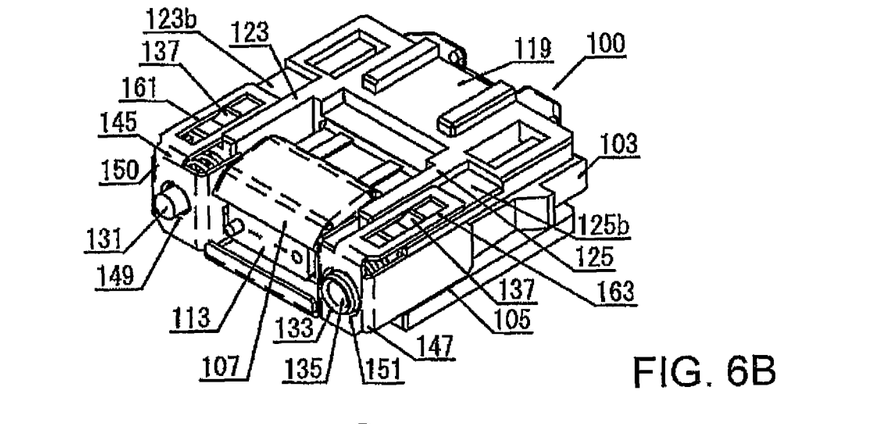
FIG. 6B is a perspective view showing a process when the optical connectors 100 are fitted to each other, and is a diagram showing a state where the shutter 107 is opened part way, wherein one of the optical connectors is not illustrated.
Figure 6C:
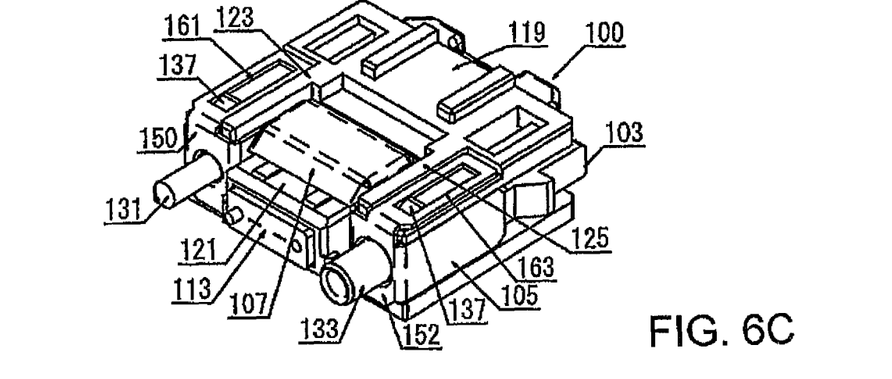
FIG. 6C is a perspective view showing a process when the optical connectors 100 are fitted to each other, and is a diagram showing a state where the shutter 107 is fully opened, wherein one of the optical connectors is not illustrated.
Figure 7A:
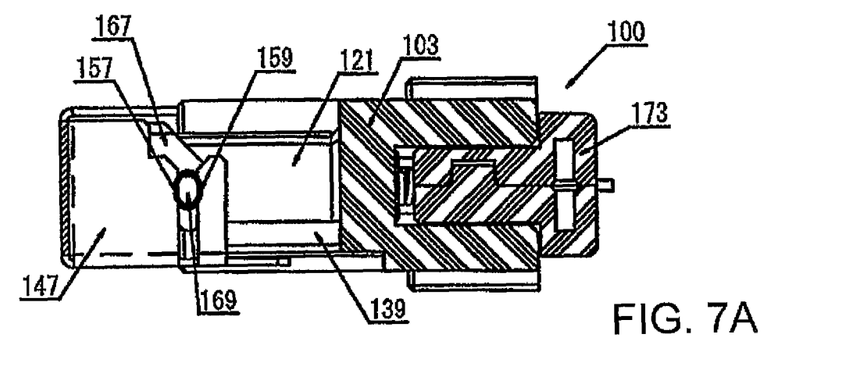
FIG. 7A is a 3A-3A cross-sectional view of FIG. 1B and is a diagram showing a state corresponding to FIG. 6A.
Figure 7B:
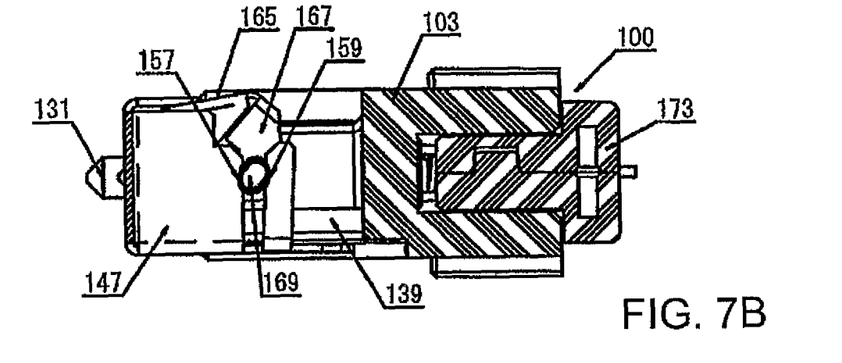
FIG. 7B is a 3A-3A cross-sectional view of FIG. 1B and is a diagram showing a state corresponding to FIG. 6B.
Figure 7C:
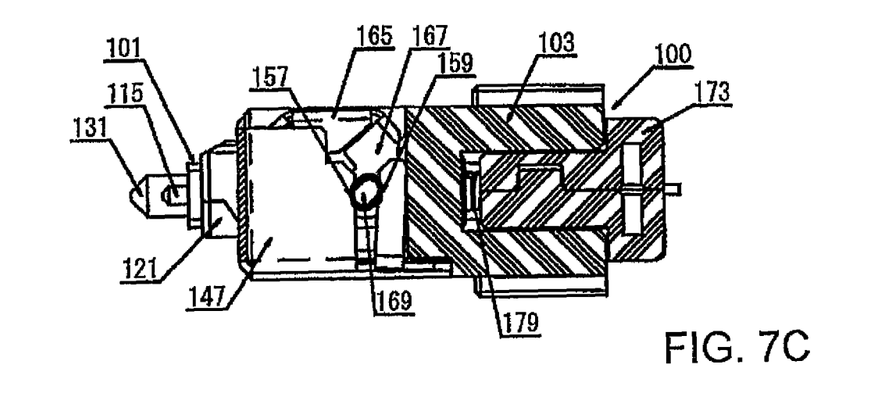
FIG. 7C is a 3A-3A cross-sectional view of FIG. 1B and is a diagram showing a state corresponding to FIG. 6C.

Further, in this event, as shown in FIG. 6B, the guide pin receivers 133 are exposed from the sliders 105 and the facing guide pins 131 are also exposed from the guide pin through holes 149 so as to be inserted into the guide pin insertion holes 135 of the guide pin receivers 133.

Herein, the diameter of the guide pin through hole 149 is smaller than that of the guide pin receiver 133 and, therefore, after the guide pin receivers 133 are exposed from the sliders 105, the guide pin receivers 133 abut and push the sliders 105 (the peripheries of the guide pin through holes 149 of the slide fixing portions 145).

Therefore, even if spring constants of the slider-side coil springs 109 of the optical connectors 100 are different from each other so that deformations of the slider-side coil springs 109 differ from each other, it is possible to reliably slide the sliders 105.

When the sliders 105 continue to be pushed and abut against the housings 103, the shutters 107 are away from the connection surfaces 113 and, therefore, as shown in FIGS. 6C, 7C, 8C, and 9C, the connection surfaces 113 are completely exposed and brought into abutment with each other.

The abutting connection surfaces 113 adhere to each other by elastic forces of the boot-side coil springs 179.

In this manner, as shown in FIGS. 5A and 5B, the optical connectors 100 are connected to each other to form the optical connector device 200.

The rotation angle (from the closed state) of the rotary shaft 169 in this event is about 50°.

Herein, as described above, since the slider 105 and the slider-side coil springs 109 are arranged in parallel in the optical connector 100, the optical connector 100 is small in sliding amount and thus is easy to miniaturize compared to a case where the slider 105 and the slider-side coil springs 109 are arranged in tandem.

In the optical connector 100, the rotary shafts 169 of the shutter 107 are provided more on the housing 103 side than both ends of the front plate 165 and offset to the lower side of the housing 103 and the front plate 165 has the shape that follows the circular arc 170 having the rotary shaft 169 at its center.

Therefore, compared to a case where the rotary shafts 169 are provided at end portions of the front plate 165, the rotation angle in opening and closing of the shutter 107 becomes smaller (less than 90°) so that the amount of movement in the sliding direction of the shutter 107 becomes smaller, which makes easier the miniaturization of the optical connector.

Further, in the optical connector 100, the rotary shafts 169 of the shutter 107 are elliptical in shape.

Therefore, the rotary shafts 169 do not slide in the rotary shaft holding portions 157 and 159 either in the state where the shutter 107 is opened or in the state where the shutter 107 is closed, and thus, there is no need for a member such as a spring for maintaining the opened or closed state of the shutter 107, which enables further miniaturization.

For releasing the connection between the optical connectors 100 to disengage them from each other, forces opposite to those for the engagement are applied to the optical connectors 100 in the connected state.

Thereupon, first, the connection surfaces 113 of the optical members 101 are separated from each other and then the guide pin receivers 133 are separated from the mating-side guide pins 131 and sliders 105, and therefore, the sliders 105 each move in the direction (direction A1 in FIG. 1B) away from the housing 103 due to the elastic force of the slider-side coil springs 109.

In this event, the engaging portions 171 of each shutter 107 move in the direction A1 in FIG. 1B along with the slider 105 while sliding on the guide surfaces 140 of the slide projections 139 of the housing 103. Upon reaching the shutter fixing grooves 141, the engaging portions 171 fall into the shutter fixing grooves 141.

In this event, each rotary shaft 169 is pressed by the rotary shaft holding portions 157 and 159 so that its major axis direction is oriented upward, i.e. by the configuration of the slit 153, an elastic force is applied to the rotary shaft 169 to bias the rotary shaft 169 in a direction in which the shutter 107 is closed. Accordingly, the rotary shaft 169 rotates in a direction B2 in FIG. 8B so that the shutter 107 is closed. Since each slide projection 139 of the housing 103 has, on its end side with respect to the shutter fixing groove 141, the locking portion 139a which is higher than the guide surface 140, when the shutter 107 falls into the shutter fixing grooves 141, the side plates 167 of the shutter 107 abut against the locking portions 139a so that the shutter 107 does not rotate anymore.

Finally, when the slider coming-off preventing projections 137 of the housings 103 abut against the elongated holes 161 and 163 of the sliders 105 and the cut-bent portions 144 of the bottom plates 143 engage with the side surfaces of the recesses 121a of the optical member receiving portions 121, the movement of the sliders 105 is stopped, thus returning to the state before the engagement.

The foregoing is the operations when the optical connector 100 engages with and disengages from the other connector (connection mating side).

As described above, according to this embodiment, the optical connector 100 comprises the housing 103 movably holding the optical member 101, the slider 105 slidably held by the housing 103, the shutter 107 provided to the slider 105 in an openable and closable manner and adapted to be opened and closed to expose and isolate the optical member 101 to and from the outside, and the slider-side coil springs 109 arranged in parallel in the width direction of the shutter 107 and pushing the slider 105 in the direction away from the housing 103.

Therefore, compared to the case where the slider 105 and the slider-side coil springs 109 are arranged in tandem, the optical connector 100 is small in sliding amount in opening and closing of the shutter 107 and thus is easy to miniaturize.

Further, according to this embodiment, in the optical connector 100, the rotary shafts 169 of the shutter 107 are provided more on the housing 103 side than both ends of the front plate 165 and offset to the lower side of the housing 103 and the front plate 165 has the shape that follows the circular arc 170 having the rotary shaft 169 at its center.

Therefore, compared to the case where the rotary shafts 169 are provided at end portions of the front plate 165, the rotation angle in opening and closing of the shutter 107 becomes smaller so that the amount of movement in the sliding direction of the shutter 107 in opening and closing thereof becomes smaller, which makes easier the miniaturization of the optical connector.

Further, according to this embodiment, in the optical connector 100, the rotary shafts 169 of the shutter 107 are elliptical in shape and, in the closed state of the shutter 107, the engaging portions 171 are in engagement with the shutter fixing grooves 141.

Therefore, there is no need for a member such as a spring for maintaining the opened or closed state of the shutter 107 or applying a rotational force for rotation thereof, which enables further miniaturization.

INDUSTRIAL APPLICABILITY

While this invention has been described with reference to the embodiment, this invention is not limited thereto.

It is apparent that those skilled in the art can think of various changes and improvements in the technical scope of this invention and it is understood that those are also included in the scope of this invention.

For example, while, as the connection object of the optical connector 100, the optical connector 100 of the same structure is given in the above-mentioned embodiment, the connection object of the optical connector 100 is by no means limited thereto. Anything that has a structure capable of pushing the slider 105 and optically connectable to the connection surface 113 of the optical member 101 can be connected to the optical connector 100.

In the above-mentioned embodiment, the slider-side coil springs 109 are provided in number of two. However, the two slider-side coil springs 109 are not necessarily required and it is sufficient if the slider-side coil spring 109 is provided at least on the side where the guide pin 131 is provided.

In the above-mentioned embodiment, the slide portion 139 has the projection shape (slide projection). However, the slide portion 139 may be configured to have a groove shape in which the side plate 167 or the engaging portion 171 of the shutter 107 can pass. Further, although the abutting portion 141 is used as a part of the shutter fixing groove, it is not necessarily a groove and an end face of the slide portion 139 may be used as the abutting portion 141. In the case where it is not formed as a groove, the structure of the locking portion 139a is not required and a lower portion of the shutter 107 may be configured to abut against the bottom plate 143 of the slider 105. That is, the locking portion 139a may either be provided or not.

DESCRIPTION OF SYMBOLS 100 optical connector
101 optical member
103 housing
105 slider
107 shutter
109 slider-side coil spring (elastic member)
111 optical fiber insertion surface
113 connection surface
115 connection surface convex portion
117 connection surface concave portion
119 body
121 optical member receiving portion
121a recess
123 both-end box portion
123a front surface
123b upper surface
125 both-end box portion
125a front surface
125b upper surface
127 elastic member receiving recess
129 elastic member receiving recess
131 guide pin
133 guide pin receiver
135 guide pin insertion hole
137 slider coming-off preventing projection
139 slide projection (slide portion)
139a locking portion
140 guide surface
141 shutter fixing groove (abutting portion)
143 bottom plate
144 cut-bent portion
145 slide fixing portion
147 slide fixing portion
149 guide pin through hole
150 front surface
151 guide pin receiver through hole
152 front surface
153 slit
157 rotary shaft holding portion (holding portion)
159 rotary shaft holding portion (holding portion)
161 elongated hole
162 upper surface
163 elongated hole
164 upper surface
165 front plate
167 side plate
169 rotary shaft
170 circular arc
171 engaging portion
173 protective boot
175 upper boot
177 lower boot
179 boot-side coil spring
181 boot-side recess
183 boot-side through hole
185 boot-side projection
187 optical fiber
200 optical connector device

The invention claimed is:

1. An optical connector comprising:
a housing holding an optical member;
a slider slidably held by the housing;
a shutter provided to the slider in an openable and closable manner and adapted to be opened and closed to expose and isolate the optical member to and from the outside; and
an at least one elastic member pushing the slider in a direction away from the housing,
wherein the elastic member is disposed in a width direction of the shutter, wherein the shutter is closed when the slider is moved by an elastic force of the elastic member in the direction away from the housing, and wherein the shutter is opened when the slider is moved against the elastic force of the elastic member in a direction approaching the housing.

2. The optical connector according to claim 1, wherein the shutter comprises:

a plate-like front plate adapted to cover the optical member;

side plates provided at both ends of the front plate; and rotary shafts which are provided to the side plates more on a housing side than both ends of the front plate and offset to a lower side of the housing and which are rotatably held by the slider, and wherein the shutter is opened and closed while rotating with respect to the rotary shafts.

3. The optical connector according to claim 2, wherein the slider comprises a pair of holding portions which hold therebetween each of the rotary shafts of the shutter, and wherein each rotary shaft has an elliptical shape.

4. The optical connector according to claim 3, wherein each rotary shaft has an oval shape or a track shape.

5. The optical connector according to claim 3, wherein the housing comprises a body having a Π-shape in plan view and has slide portions provided at facing surfaces, on the inside of the Π-shape, of the body so as to face each other and each having a guide surface parallel to the sliding direction and an abutting portion extending downward from the guide surface, wherein the side plates of the shutter each have an engaging portion adapted to engage with the abutting portion in a closed state, and wherein when the slider is moved against the elastic force of the elastic member in the direction approaching the housing, the engaging portions disengage from the abutting portions and move while riding on the guide surfaces so that the shutter is rotated with respect to the rotary shafts so as to be opened.

6. The optical connector according to claim 5, wherein the slider comprises a plate-like bottom plate and a pair of slide fixing portions provided on both sides of the bottom plate and each having a box shape in which at least a surface facing a front surface of the Π-shape of the housing is open, the box shape adapted to cover each of portions corresponding to two sides at both ends of the Π-shape, and wherein slits are formed in surfaces facing each other of the pair of slide fixing portions and both side surfaces of each slit form the pair of holding portions.

7. The optical connector according to claim 6, wherein the housing comprises:

a guide pin provided at one of the portions corresponding to the two sides at both ends of the Π-shape; and a guide pin receiver provided at the other of the portions corresponding to the two sides at both ends of the Π-shape and engageable with a guide pin, wherein the slider comprises:

a guide pin receiver through hole which is provided in one of the pair of slide fixing portions and in which the guide pin receiver is inserted; and a guide pin through hole which is provided in the other of the pair of slide fixing portions and in which the guide pin is inserted, the guide pin through hole having a diameter smaller than that of the guide pin receiver through hole, and wherein when the slider is moved, the guide pin receiver and the guide pin are exposed from the guide pin receiver through hole and the guide pin through hole, respectively.

8. The optical connector according to claim 6, wherein the front plate of the shutter has a side shape that follows a circular arc having the rotary shaft at its center, and a radius of the circular arc is set to a distance between the rotary shaft and an upper surface of the housing or less.

9. The optical connector according to claim 6, wherein the elastic member is a coil spring and is provided so that both ends thereof are in contact with at least one of the portions corresponding to the two sides at both ends of the Π-shape of the housing and in contact with at least one of the slide fixing portions, the elastic member pushing the slide fixing portion in the direction away from the housing.

10. The optical connector according to claim 5, wherein the housing has a locking portion adapted to abut against the side plate of the shutter when the shutter is closed.

11. The optical connector according to claim 1, wherein the elastic member is provided in a pair and the pair of elastic members are arranged in parallel in the width direction of the shutter.

12. An optical connector device comprising two optical connectors each according to claim 7, wherein the optical connector device has a structure in which the guide pin receiver exposed from the slider of each of the two optical connectors abuts against a periphery of the guide pin through hole of the slide fixing portion of the other optical connector and pushes the slide fixing portion thereof so that the sliders of the optical connectors are moved, thereby connecting the two optical connectors together.

* * * * *